United States Patent
Liu et al.

(10) Patent No.: US 10,246,784 B2
(45) Date of Patent: Apr. 2, 2019

(54) DECREASING CORROSION ON METAL SURFACES WITH APATITE FORMING COMPONENTS

(71) Applicant: BAKER HUGHES INCORPORATED, Houston, TX (US)

(72) Inventors: Zhengwei Liu, Houston, TX (US); Tracey Jackson, Sugar Land, TX (US); Richard Martin, Pinehurst, TX (US)

(73) Assignee: Baker Hughes, a GE company, LLC, Houston, TX (US)

(*) Notice: Subject to any disclaimer, the term of this patent is extended or adjusted under 35 U.S.C. 154(b) by 50 days.

(21) Appl. No.: 15/354,578

(22) Filed: Nov. 17, 2016

(65) Prior Publication Data

US 2017/0152604 A1    Jun. 1, 2017

Related U.S. Application Data

(60) Provisional application No. 62/260,861, filed on Nov. 30, 2015.

(51) Int. Cl.
| | |
|---|---|
| *C23F 11/18* | (2006.01) |
| *C09D 1/00* | (2006.01) |
| *C09D 5/08* | (2006.01) |
| *C09D 7/40* | (2018.01) |
| *C09K 8/54* | (2006.01) |
| *C23F 11/08* | (2006.01) |
| *C23F 11/10* | (2006.01) |
| *C09D 7/61* | (2018.01) |

(52) U.S. Cl.
CPC .............. *C23F 11/184* (2013.01); *C09D 1/00* (2013.01); *C09D 5/084* (2013.01); *C09D 7/40* (2018.01); *C09D 7/61* (2018.01); *C09K 8/54* (2013.01); *C23F 11/08* (2013.01); *C23F 11/10* (2013.01); *C02F 2303/08* (2013.01); *C09K 2208/32* (2013.01)

(58) Field of Classification Search
None
See application file for complete search history.

(56) References Cited

U.S. PATENT DOCUMENTS

| | | | | |
|---|---|---|---|---|
| 5,296,167 A | * | 3/1994 | Murray ................. | C23F 11/184 252/387 |
| 5,972,868 A | * | 10/1999 | Athey ..................... | C09K 8/528 134/2 |
| 6,391,830 B1 | * | 5/2002 | Dobson, Jr. .............. | C09K 8/08 507/111 |
| 6,416,252 B1 | * | 7/2002 | Moore ..................... | B09B 1/00 405/129.45 |
| 6,592,294 B1 | * | 7/2003 | Moore ..................... | B09B 1/00 405/128.75 |
| 2001/0025945 A1 | * | 10/2001 | Amer ..................... | C02F 1/5236 252/175 |
| 2009/0029878 A1 | * | 1/2009 | Bicerano ................ | C09K 8/035 507/107 |
| 2011/0023748 A1 | * | 2/2011 | Wagh ...................... | C04B 28/34 106/18.14 |
| 2016/0108327 A1 | * | 4/2016 | Pulikkathara .......... | B01D 21/01 166/304 |

FOREIGN PATENT DOCUMENTS

| | | | |
|---|---|---|---|
| JP | 2015-025209 | * | 2/2015 |
| WO | WO2015/094218 | * | 6/2015 |

OTHER PUBLICATIONS

Machine translation of JP 2015-025209, Feb. 2015.*
Rokita et al, Journal of Molecular Structure, 744-747, pp. 589-595, available online Mar. 8, 2005.*
Gopi et al, Applied Surface Science, 286, pp. 83-90, available online Sep. 14, 2013.*
Chew et al, (Key Engineering Materials, 507 (Electrophoretic Deposition: Fundamental and Application (IV) ), pp. 141-146, available online Mar. 15, 2012).*

* cited by examiner

*Primary Examiner* — Erma C Cameron
(74) *Attorney, Agent, or Firm* — Mossman, Kumar & Tyler, P.C.

(57) ABSTRACT

Corrosion to a metal surface in contact with corrosion forming components within an aqueous-based fluid system may be decreased, prevented, and/or inhibited by contacting the metal surface(s) with apatite forming components and forming at least one apatite species on the surface with the apatite forming components. The apatite forming components may be or include phosphates, organophosphates and combinations thereof. In a non-limiting embodiment, the apatite forming components may further include fluorides, chlorides, calcium, and combinations thereof.

14 Claims, No Drawings

DECREASING CORROSION ON METAL SURFACES WITH APATITE FORMING COMPONENTS

CROSS-REFERENCE TO RELATED APPLICATION

This application claims the benefit of Provisional Patent Application No. 62/260,861 filed Nov. 30, 2015, which is incorporated by reference herein in its entirety.

TECHNICAL FIELD

The present invention relates to decreasing corrosion on a surface by contacting at least one metal surface with apatite forming components and forming at least one apatite species on the metal surface(s) with the apatite forming components.

BACKGROUND

Corrosion accumulates on internal walls of various oil and gas producing wellbores, pipe surfaces, wellbore surfaces, etc. Such corrosion occurs when fluids are produced from the reservoir. Many produced fluids have corrosion forming components therein, which attack metal surfaces to varying degrees depending on the aggressiveness of the environment, such as high salinity, high acidity, etc.

For example, corrosion may occur because a brine-based fluid or system becomes saturated with add gases. Corrosion may occur due to changes in $CO_2$ partial pressure, $H_2S$ partial pressure, acetate concentration, protective scale formation, pH, shear/turbulence, water-to-oil ratio, crude oil properties, temperature, or total pressure changes.

Chemical corrosion inhibitors decrease the rate of corrosion and thereby decrease the amount of damage to metal surfaces, such as a downhole metal tubulars, a refinery metal surface, and the like in a non-limiting embodiment. Traditional corrosion inhibitors for decreasing corrosion have not been satisfactory in an environment having high calcium content, high temperature, and/or a high amount of total dissolved solids in the presence of acid gas such as $CO_2$ and other corrosive species such as but not limited to acetate ion. 'Total dissolved solids' (TDS) is defined herein as the combined content of all inorganic and organic substances dissolved in the water phase.

Thus, it would be desirable if methods and/or inhibitors for decreasing corrosion to metal surfaces could be improved.

SUMMARY

There is provided, in one form, a method for decreasing corrosion of low carbon steel surfaces by contacting the metal surface(s) with apatite forming components, and forming at least one apatite species on the metal surface(s) with the apatite forming components. Less corrosion may occur on the metal surface(s) as compared to an otherwise identical method absent the contact of the metal surface with the apatite forming components.

There is further provided another non-limiting embodiment of a method of decreasing corrosion to a metal surface within an aqueous-based fluid system where the method includes circulating apatite forming components into an aqueous-based fluid system comprising at least one metal surface where the aqueous-based fluid system comprises corrosion forming components, and forming at least one apatite species on the metal surface(s) with the apatite forming components. Less corrosion may occur on the metal surface(s) as compared to an otherwise identical method absent the circulating of the apatite forming components.

In another non-limiting embodiment, an aqueous-based fluid system is described, which may include at least one metal surface, an aqueous-based fluid, apatite forming components in an amount ranging from about 10 ppm to about 10,000 ppm based on the total volume of the aqueous based fluid or based on total fluids. Less corrosion to the metal surface(s) may occur in the presence of the apatite forming components as compared to an otherwise identical metal surface absent the apatite forming components.

DETAILED DESCRIPTION

It has been discovered that corrosion to low carbon steel surfaces may be decreased, prevented, and/or inhibited by forming at least one apatite species on the metal surface(s) by contacting the metal surface(s) with apatite forming components and forming an apatite species on the metal surface. The formation may occur by creation of a layer of the apatite species on the metal surfaces, depositing the apatite forming components on the metal surfaces for subsequent conversion into its appropriate apatite species, and combinations thereof. For example, a layer of the apatite forming components may form a film on the metal surface and then be contacted with an aqueous fluid comprising high calcium content, high chloride content, high temperatures, high total dissolved solids, and combinations thereof to from the appropriate apatite species on the metal surface. In addition or in the alternative, the apatite forming components may be circulated into an aqueous-based fluid system comprising an aqueous-based fluid and at least one metal surface in contact with corrosion forming components, where the apatite forming components subsequently contact a metal surface and deposit a layer of apatite species there onto.

In a non-limiting embodiment, the apatite forming components may form at least one apatite species as a film of the formed apatite species deposited on the surface.

'Deposited' as used herein means that the substance (i.e. the apatite forming components, and/or the formed apatite species) at least partially forms a layer or film onto the metal surface either by absorbing into and/or adsorbing onto the metal surface. In a non-limiting instance, the apatite forming components and/or formed apatite species absorbs into the surface and does not adsorb onto the surface; alternatively, the apatite forming components and/or formed apatite species adsorbs onto the surface but does not absorb into it.

The metal surface(s) may be present in a location, such as but not limited to, a subterranean reservoir wellbore, a refinery for refining of production fluids or byproducts of the production fluids, both fluids of which are also known as 'refinery fluids', and the like. The metal surface(s) may be painted or coated in a non-limiting embodiment. The metal surface(s) may be or include, but is not limited to an iron-containing metal surface, such as steel; an aluminum-containing metal surface; yellow metal surfaces, such as copper and copper alloys; and combinations thereof.

'Apatite forming components' may be or include any components present in the aqueous-based fluid system that form at least one apatite species. In a non-limiting embodiment, the apatite forming components may be or include, but are not limited to, phosphates, organophosphates and combinations thereof. Non-limiting examples of the phosphates may be or include phosphates, optional chlorides, optional fluorides, and combinations thereof. The phosphates may be or include, but are not limited to hydrogen phosphates, dihydrogen phosphates, polymeric phosphate ions, including diphosphate, triphosphate (and so forth), and combinations thereof. Similarly non-limiting examples of the organophosphates may be or include various esters of phosphoric acid, sulphonated and quaternized phosphate esters and combinations thereof. If several apatite forming components are added to the fluid and/or the surface, the various apatite forming components may be added at the same time or separately.

In a non-limiting embodiment, the apatite forming components may contact the metal surface(s) in an amount ranging from about 1 ppm independently to about 20,000 ppm based on the total volume of an aqueous-based fluid of which the apatite forming components may be dispersed therein, alternatively from about 10 ppm independently to about 10,000 ppm, or from about 100 ppm independently to about 1,000 ppm in another non-limiting embodiment. As used herein with respect to a range, "independently" means that any threshold may be used together with another threshold to give a suitable alternative range, e.g. about 1 ppm independently to about 10 ppm is also considered a suitable alternative range for the amount of the apatite forming components. The amount of apatite forming components will be added as ppm by weight and be based either on water content of the fluid or based on total fluid weight.

In a non-limiting embodiment, at least one conventional corrosion inhibitor may be circulated into the aqueous-based fluid system at the same time as the corrosion inhibiting, apatite forming components. The conventional corrosion inhibitor(s) may be or include, but are not limited to imidazoline, quaternary amines, mercaptans, carboxylic acid and combinations thereof. The corrosion inhibitor(s) may be included in or added to the aqueous-based fluid system in an amount ranging from about 1 ppm to about 10000 ppm based on an aqueous-based fluid of which the apatite forming components may be dispersed therein, alternatively from about 5 ppm independently to about 5000 ppm, or from about 10 ppm independently to about 1000 ppm in another non-limiting embodiment.

Although the inventors do not wish to be bound to any particular theory, it is thought the apatite forming components may initially form a type of matrix in the presence of calcium, a high temperature environment, and/or a high amount of total dissolved solids. This matrix is then converted to an apatite-based species over time. Therefore the apatite forming components may initiate or catalyze an apatite species with the calcium or with another calcium-based scale. This initiation may occur in solution or directly on the metal surface(s). In a non-limiting embodiment, calcium and/or calcium ions may be included as part of the 'apatite forming components' because calcium is required to form the apatite species; however, the calcium and/or calcium ions may also be in contact with the metal surface prior to, during, or after the contacting of the metal surface with the apatite forming components. For example, the calcium and/or calcium ions may be present in a brine-based aqueous fluid that also includes the apatite forming components and/or the calcium and/or calcium ions may be present in a brine-based aqueous fluid circulated before or after the aqueous-based fluid comprising the apatite forming components.

In yet another non-limiting embodiment, formed apatite species may incorporate the corrosion inhibitor where the apatite and corrosion inhibitor form a structure similar to a surfactant, e.g. the apatite species functions as phosphate head, and the corrosion inhibitor functions as a long chain hydrocarbon tail. In this non-limiting instance, the corrosion inhibitor head becomes part of the apatite matrix adhering to the metal surface. The hydrophobic tail is then secured to the surface, protrudes from the surface, and acts as a barrier to water and corrosion.

Non-limiting examples of the formed apatite species may be or include, but are not limited to, fluoroapatite, chloroapatite, hydroxyapatite, and combinations thereof.

In a non-limiting embodiment, an aqueous-based fluid in contact with the metal surface may include corrosion forming components in an amount ranging from about 10 ppm independently to about 50,000 ppm based on the total volume of the aqueous fluid, alternatively from about 100 ppm independently to about 10,000 ppm, or from about 500 ppm independently to about 5,000 ppm.

One non-limiting embodiment would be direct contact of the metal surface with apatite forming species in an hydrocarbon-based solution. This solution would be applied in a batch treatment in neat form (i.e. without being diluted in a solvent) to film the tubulars or process piping before allowing the well to flow. For example, while the well or pipeline was shut down a slug of apatite forming components in a hydrocarbon-based solution would be applied in neat form to directly apply a corrosion inhibitor film to the metal surface. Once the well or pipeline was brought back online then the resultant temperature, pressure, and other environmental variables in conjunction with the presence of apatite forming components would create a protective apatite layer on the metal surface. The exact application method would not be limited to slugging or pigging the chemical into the metal pipe.

The corrosion forming components may have or include, but are not limited to, metal carbonates, metal sulfates, metal oxides, metal hydroxides, and combinations thereof. The retention of the respective salt constituents in ionic form, i.e. the solubility, depends upon such factors as water temperature, pH, ion concentration, and the like.

An aqueous based fluid comprising the corrosion forming components may be present in an aqueous-based fluid system, and the same fluid or a different aqueous-based fluid may include the apatite forming components for circulating the apatite forming components into the aqueous-based fluid system. The pH of the aqueous-based fluid comprising the apatite forming components may be greater than about 7, alternatively from about 7 to about 9, or from about 7.3 to about 8.5 in another non-limiting embodiment. However, at high $CO_2$ partial pressure (90 to 1250 psia) and depending on temperature another embodiment could be approximately pH 4 to 5.

The temperature of the aqueous-based fluid system may range from about 30° C. independently to about 450° C., alternatively from about 90° C. independently to about 160° C., or from about 140° C. independently to about 400° C. in another non-limiting embodiment. The aqueous-based fluid (s) circulated into the aqueous-based fluid system may include an amount of total dissolved solids ranging from about 1,000 ppm independently to about 400,000 ppm based on the total water volume of an aqueous-based fluid, alternatively from about 2,000 ppm independently to about 100,000 ppm, or from about 10,000 ppm independently to about 50,000 ppm in another non-limiting embodiment.

The forming of the apatite specie(s) onto the surface within the aqueous-based fluid system may suppress or decrease the amount of and/or the rate of corrosion formation thereon or therein. That is, it is not necessary for corrosion to be entirely prevented for the methods and compositions discussed herein to be considered effective, although complete prevention is a desirable goal. Success is obtained if less of a metal surface is corroded than in the absence of the apatite forming components. Alternatively, the methods and aqueous-based fluid systems described are considered successful if there is at least a 30% decrease in corrosion formation on the targeted metal surfaces within the aqueous-based fluid system.

'Aqueous-based fluid system' or 'system' is defined herein to include an aqueous-based fluid and any components therein (e.g. pipes or conduits where the aqueous fluid may flow through or alongside). The system may include an aqueous-based fluid, corrosion forming components, and/or apatite forming components. In a non-limiting embodiment, aqueous-based fluid(s) comprising the apatite forming components may be circulated through a subterranean reservoir wellbore for contacting a metal surface before, during, or after a downhole operation. The downhole operation may be or include, but is not limited to, a drilling operation, a completions operation, a stimulation operation, an injection operation, a servicing or remedial operation, and combinations thereof. However most likely the embodiment will be used during production of the reservoir fluids once all of the drilling, cementing, and completions are in place and the well is flowing.

Circulating the aqueous-based fluid comprising the apatite species into the subterranean reservoir wellbore may occur by injecting an aqueous-based fluid there into where the fluid comprises the apatite forming components. In a non-limiting embodiment, the circulating of the aqueous-based fluid comprising the apatite forming components may occur at a location, such as but not limited to, a wellhead, an injector well, and combinations thereof. The apatite forming components may be circulated into the subterranean reservoir wellbore at the same time or different times (i.e. before or after a downhole fluid). In this instance the apatite forming components are circulated into the subterranean reservoir wellbore at the same time as the downhole fluid, the apatite forming components may be added to the downhole fluid prior to the circulation of the downhole fluid into the subterranean reservoir wellbore.

A drilling operation is used to drill into a subterranean reservoir formation, and a drilling fluid accompanies the drilling operation. A completions operation is performed to complete a well, such as the events and assembly of equipment (e.g. downhole tubulars) to bring a well into production once the drilling operations are done. A stimulation operation is one where a treatment is performed to restore or enhance the productivity of a well, such as hydraulic fracturing (above the fracture pressure of the reservoir formation) and matrix treatments (below the fracture pressure of the reservoir formation). An injection operation includes a well where fluids are injected into the well, instead of produced therefrom. A servicing operation allows for maintenance to the well during and/or after the well has been completed and/or produced, enhancing the well productivity, and/or monitoring the performance of the well or reservoir.

Each downhole operation has its own respective downhole fluid, e.g. downhole operations utilize drilling fluids. Downhole fluids are typically classified according to their base fluid. In aqueous based fluids, solid particles are suspended in a continuous phase consisting of water or brine. Oil can be emulsified in the water, which is the continuous phase. "Aqueous based fluid" is used herein to include fluids having an aqueous continuous phase where the aqueous continuous phase can be all water, brine, seawater, and combinations thereof; an oil-in-water emulsion, or an oil-in-brine emulsion; and combinations thereof. For example, brine-based fluids are aqueous based fluids, in which the aqueous component is brine. 'Brine' is defined as a water-based fluid comprising salts that have been controllably added thereto or are present as a natural fluid from a reservoir. 'Seawater' is a specific composition of brine. The salts in the seawater have also been disposed therein by a natural process.

Oil-based fluids are insoluble in water-based fluids. "Oil-based fluid" is used herein to include fluids having a non-aqueous continuous phase where the non-aqueous continuous phase is all oil, a non-aqueous fluid, a water-in-oil emulsion, a water-in-non-aqueous emulsion, a brine-in-oil emulsion, a brine-in-non-aqueous emulsion, a seawater-in-non-aqueous emulsion. In oil-based fluids, solid particles can be suspended in a continuous phase consisting of oil or another non-aqueous fluid. Water or brine can be emulsified in the oil; therefore, the oil is the continuous phase. In oil-based fluids, the oil may consist of any oil or water-immiscible fluid that may include, but is not limited to, diesel, mineral oil, esters, refinery cuts and blends, or alpha-olefins. Oil-based fluid as defined herein may also include synthetic-based fluids or muds (SBMs), which are synthetically produced rather than refined from naturally-occurring materials. Synthetic-based fluids often include, but are not necessarily limited to, olefin oligomers of ethylene, esters made from vegetable fatty acids and alcohols, ethers and polyethers made from alcohols and polyalcohols, paraffinic, or aromatic, hydrocarbons alkyl benzenes, terpenes and other natural products and mixtures of these types.

In the foregoing specification, the invention has been described with reference to specific embodiments thereof, and has been described as effective in providing fluid compositions and methods for decreasing corrosion to a metal surface in contact with corrosion forming components as compared to otherwise identical fluid compositions and methods without the apatite forming components. However, it will be evident that various modifications and changes can be made thereto without departing from the broader spirit or scope of the invention as set forth in the appended claims. Accordingly, the specification is to be regarded in an illustrative rather than a restrictive sense. For example, specific aqueous-based fluids, downhole fluids, corrosion forming components, apatite forming components, and corrosion inhibitors falling within the claimed parameters, but not specifically identified or tried in a particular composition or method, are expected to be within the scope of this invention.

The present invention may suitably comprise, consist or consist essentially of the elements disclosed and may be practiced in the absence of an element not disclosed. For instance, the method for decreasing corrosion to a surface in contact with corrosion-forming components may consist of or consist essentially of contacting the metal surface with apatite forming components and forming a film of at least one apatite species on to the metal surface. The resultant embodiment may consist solely of an apatite based scale or a mixture of apatite and other corrosion forming components as described above.

The aqueous fluid system may consist of or consist essentially of at least one metal surface; an aqueous base fluid; apatite forming components in an amount ranging from about 10 ppm to about 10,000 ppm based on the total volume of the aqueous based fluid; and corrosion forming components; the aqueous fluid system may have less corrosion formed on the metal surface(s) therein as compared to otherwise identical metal surface(s) absent the apatite forming components.

The words "comprising" and "comprises" as used throughout the claims, are to be interpreted to mean "including but not limited to" and "includes but not limited to", respectively.

What is claimed is:

1. A method for decreasing corrosion to a metal surface in an oil production system, wherein the method comprises:
    circulating an aqueous-based fluid comprising apatite forming components into an oil production system;
    contacting at least one metal surface within the oil production system with the apatite forming components; and
    forming at least one apatite species selected from the group consisting of fluoroapatite, chloroapatite, and combinations thereof on the at least one metal surface with the apatite forming components;
    wherein less corrosion occurs to at least one metal surface as compared to an otherwise identical method without the contact of at least one metal surface with the apatite forming components.

2. The method of claim 1, wherein the metal surface is selected from the group consisting of an iron-containing surface, an aluminum-containing surface, a copper-containing surface, and combinations thereof.

3. The method of claim 1, wherein the apatite forming components are selected from the group consisting of phosphates, organophosphates, and combinations thereof.

4. The method of claim 1, wherein the apatite forming components are present in the aqueous-based fluid in an amount ranging from about 1 ppm to about 20,000 ppm based on the total volume of the aqueous-based fluid.

5. The method of claim 1, wherein the aqueous-based fluid further comprises corrosion forming components in an amount ranging from about 10 ppm to about 50,000 ppm based on the total volume of the aqueous-based fluid.

6. The method of claim 1, wherein a temperature of the aqueous-based fluid ranges from about 30° C. to about 450° C.

7. The method of claim 1, further comprising contacting the metal surface with a second fluid at the same time or different time from the aqueous-based fluid; wherein the second fluid comprises total dissolved solids in an amount ranging from about 1,000 ppm to about 400,000 ppm based on the total volume of the second fluid.

8. The method of claim 1, wherein the aqueous-based fluid comprises total dissolved solids in an amount ranging from about 1,000 ppm to about 400,000 ppm based on the total volume of the aqueous-based fluid.

9. The method of claim 1, wherein the aqueous-based fluid further comprises corrosion forming components selected from the group consisting of metal carbonates, metal sulfates, metal oxides, metal phosphates, metal chloride, and combinations thereof.

10. The method of claim 1, wherein the aqueous-based fluid is selected from the group consisting of a drilling fluid, a completions fluid, an injection fluid, a servicing fluid, a production fluid, a refinery fluid, and combinations thereof.

11. A system for decreasing corrosion to a metal surface comprising:
    at least one metal surface within an oil production system;
    an aqueous-based fluid;
    at least one apatite species selected from the group consisting of fluoroapatite, chloroapatite, and combinations thereof formed upon the metal surface; and
    corrosion forming components;
    wherein less corrosion occurs to the at least one metal surface in the presence of the at least one apatite species as compared to an otherwise identical at least one metal surface absent the at least one apatite species.

12. The aqueous-based fluid system of claim 11, wherein a temperature of the aqueous-based fluid ranges from about 30° C. to about 450° C.

13. The aqueous-based fluid system of claim 11, wherein the aqueous-based fluid comprises total dissolved solids in an amount ranging from about 1000 ppm to about 400,000 ppm based on the total volume of the fluid.

14. A method for decreasing corrosion to a metal surface in an oil production system, wherein the method comprises:
    shutting down an oil production system;
    applying a hydrocarbon-based solution comprising apatite forming components to the oil production system in a batch treatment;
    contacting at least one metal surface within the oil production system system with the hydrocarbon-based solution comprising apatite forming components;
    bringing the oil production system back online,
    wherein once the oil production system is brought back online, less corrosion occurs to the at least one metal surface in the presence of the apatite forming components as compared to an otherwise identical at least one metal surface absent the apatite forming components.

* * * * *